United States Patent [19]
Beever et al.

[11] 3,847,024
[45] Nov. 12, 1974

[54] SIMULATION AND MEASUREMENT APPARATUS

[75] Inventors: Elmer R. Beever, Hacienda Heights; Rindge Shima, Santa Monica; Paul P. Zebus, Lakewood, all of Calif.

[73] Assignee: Rockwell International Corporation, El Segundo, Calif.

[22] Filed: Sept. 1, 1971

[21] Appl. No.: 177,146

Related U.S. Application Data
[62] Division of Ser. No. 843,944, July 23, 1969, abandoned.

[52] U.S. Cl. ............................. 73/432 SD, 356/244
[51] Int. Cl. ....................... G01n 1/00, G01n 21/48
[58] Field of Search ............... 73/150, 159, 432 SD; 250/52, 53; 356/244

[56] References Cited
UNITED STATES PATENTS

| | | | |
|---|---|---|---|
| 3,049,913 | 8/1962 | Hunt | 73/432 SD |
| 3,426,590 | 2/1969 | Suga | 73/150 |
| 3,580,685 | 5/1971 | Eriksson | 356/244 |
| 3,669,554 | 6/1972 | Horrer et al. | 356/244 |

*Primary Examiner*—S. Clement Swisher
*Attorney, Agent, or Firm*—D. Nardelli

[57] ABSTRACT

Apparatus for simulating solar radiation on a specimen at an exposure station and then transporting the specimen to a measurement station for determination of the optical properties of the specimen is described. Means are provided for transporting the specimen between stations, placing separate specimens in position for optical measurements, measuring temperature of the specimens, and controlling temperature of the specimens. Further, there is provided an improved optical integrating sphere for absolute measurements of specimen reflectivity.

5 Claims, 11 Drawing Figures

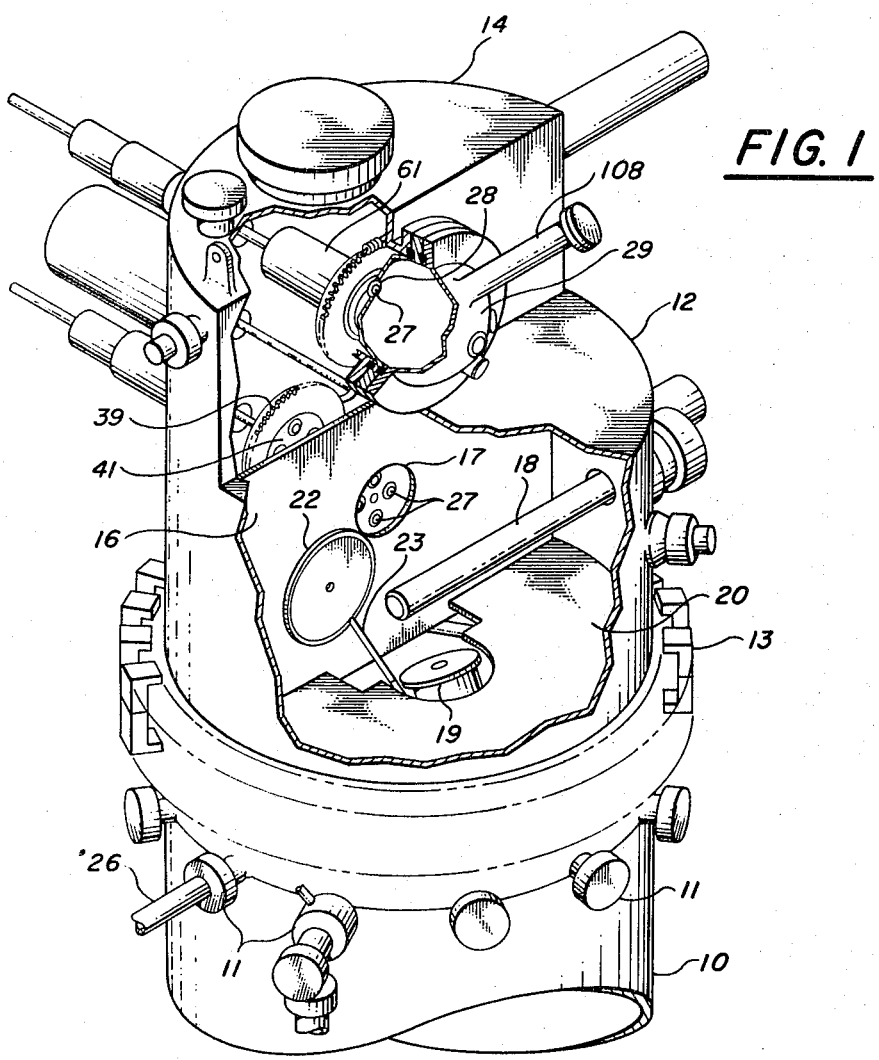
FIG. 1
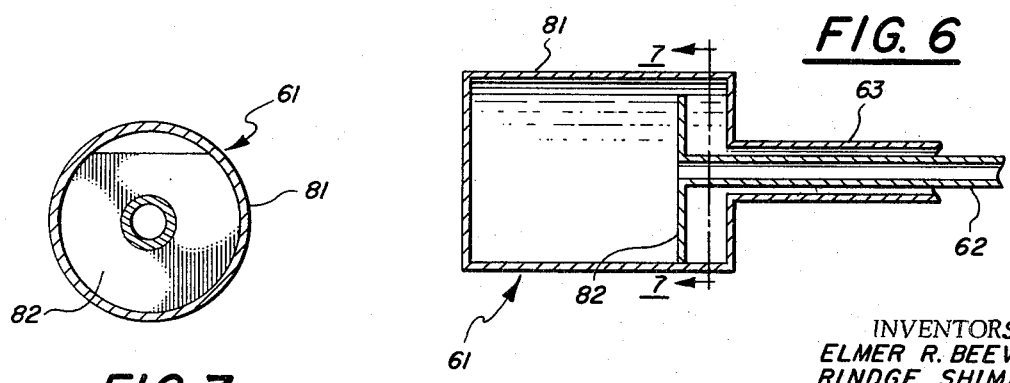
FIG. 6
FIG. 7
INVENTORS.
ELMER R. BEEVER
RINDGE SHIMA
PAUL P. ZEBUS
ATTORNEY

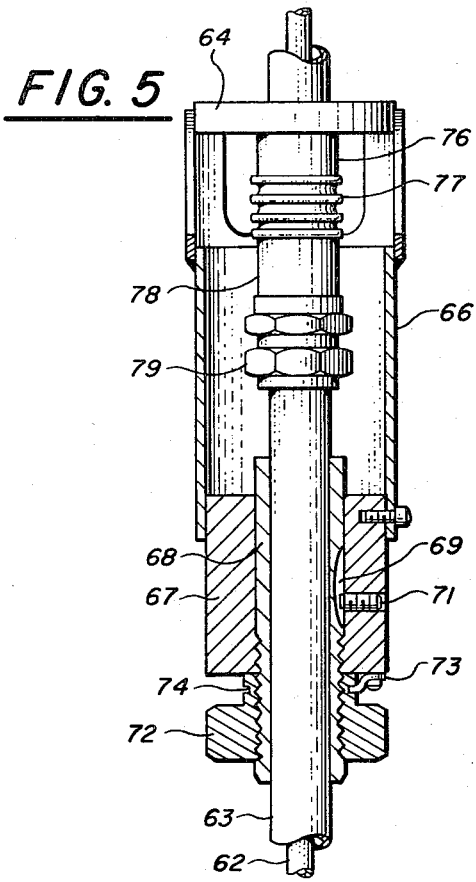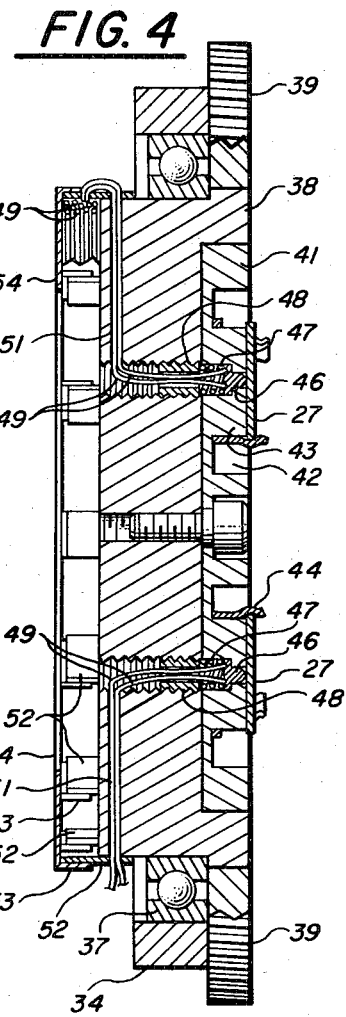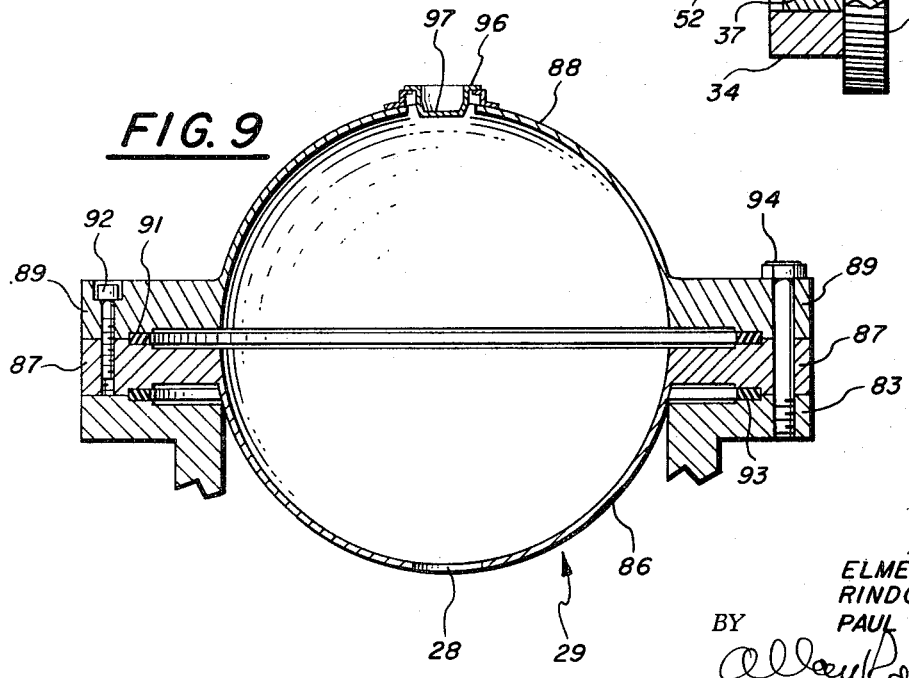

PATENTED NOV 12 1974 3,847,024

INVENTORS.
ELMER R. BEEVER
RINDGE SHIMA
PAUL P. ZEBUS
BY Allan Rothenberg
ATTORNEY

SIMULATION AND MEASUREMENT APPARATUS

This is a division, of application Ser. No. 843,944 filed July 23, 1969 now abandoned.

BACKGROUND

In the design and construction of vehicles for use in space, the temperature of the vehicle and selected parts thereof is of considerable significance. In order to control the temperature of the space vehicle it is common to provide special coatings on selected portions of the vehicle for temperature control. These thermal control coatings may have, for example, a high reflectivity in the energetic ultraviolet and visible portions of the spectrum in order to reject heating from the sun and may also have a relatively high emissivity in the infrared region so that heat generated aboard the spacecraft or absorbed from the sun can be radiated into space.

The thermal control coatings employed on spacecraft are operated in a severe environment involving high vacuum, unusual temperature regimes, irradiation by ultraviolet and bombardment by protons and similar solar particles. In this severe environment the thermal control coatings may undergo chemical and physical changes which affect the optical properties of the coating. Organic and inorganic binders employed in the coatings may be decomposed and the pigments themselves may be changed so that the optical performance of the coating is degraded.

Because of the very large investment involved in subjecting a candidate coating to the environment of space it is desirable to provide an apparatus for simulating space conditions to which a coating will be subjected and also to provide means for measuring the optical characteristics of a coating before and after exposure to the simulated environment. The measurements of optical properties should be made without removing the specimen from the vacuum of simulated space since exposure to air or other gases may further change or degrade the optical properties of the coating.

SUMMARY OF THE INVENTION

Thus in the practice of this invention according to a preferred embodiment there is provided apparatus for simulating solar radiation in space and measuring optical properties of materials exposed to the radiation, comprising an evacuable chamber with sources of ultraviolet and particulate radiation for exposing a specimen, and a transport mechanism for transporting a specimen between an exposure station and a measurement station. An optical integrating sphere is provided for optical reflectivity measurements at the measurement station.

DRAWINGS

Objects and many of the attendant advantages of this invention will be apparent as the same becomes better understood by reference to the following detailed description when considered in connection with the accompanying drawings wherein:

FIG. 1 illustrates a partial cutaway view of a solar simulator and measurement apparatus constructured according to the principles of this invention;

FIG. 4 illustrates a cross-section of a specimen mounting station of the transport mechanism;

FIG. 5 illustrates in longitudinal cross-section a movable hermetic feed-through for heat transfer fluids;

FIG. 6 illustrates a longitudinal cross section of a heat exchanger;

Figure 8:
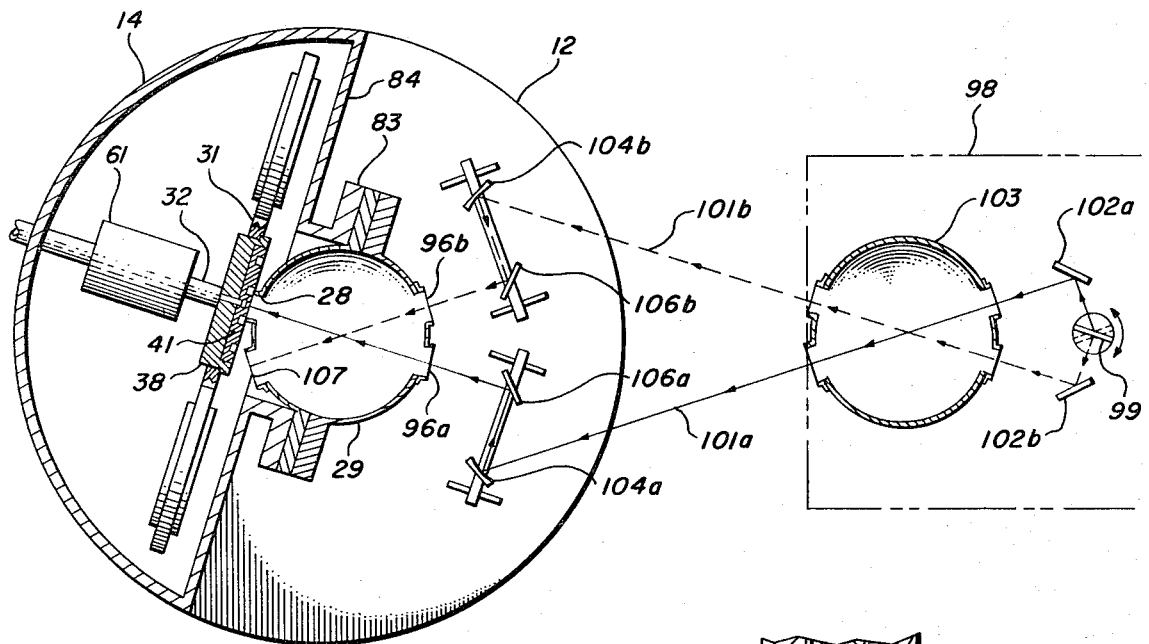
Figure 11:
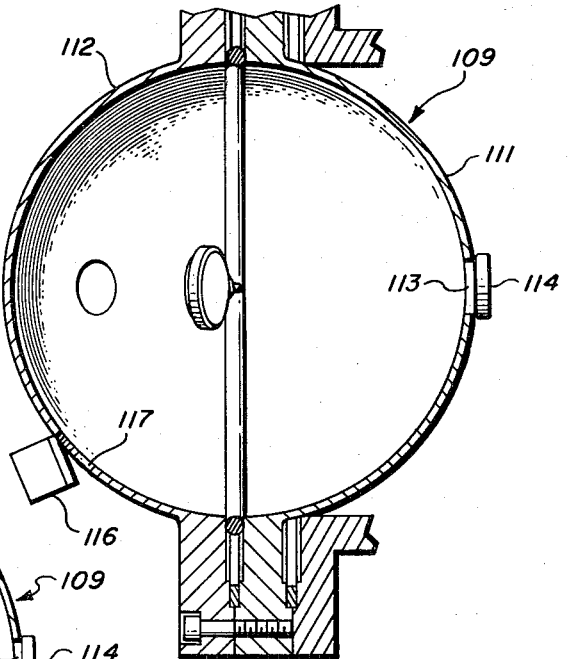
Figure 10:
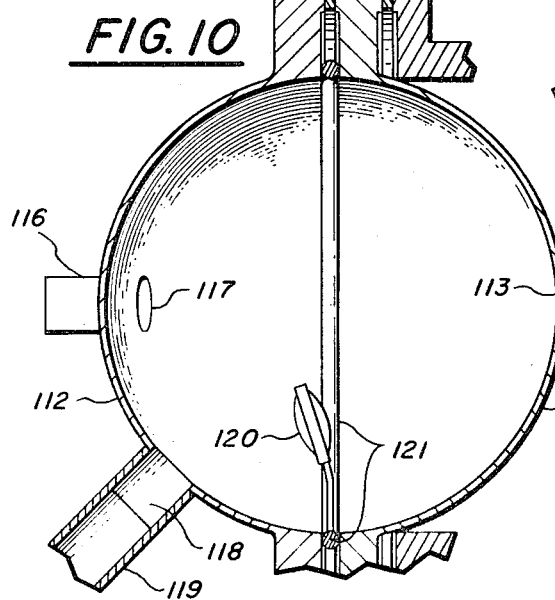

FIG. 7 comprises a transverse cross-sectional view of the heat exchanger of FIG. 6;

FIG. 8 illustrates schematically the optical arrangement at a measuring station in the simulator;

FIG. 9 illustrates in cross-section an integrating optical sphere at the measurement station;

FIG. 10 illustrates in cross-section another integrating optical sphere for absolute reflectivity measurements; and FIG. 11 illustrates another view of the sphere of FIG. 10.

Throughout the drawings like reference numerals refer to like parts.

DESCRIPTION

Figure 2:
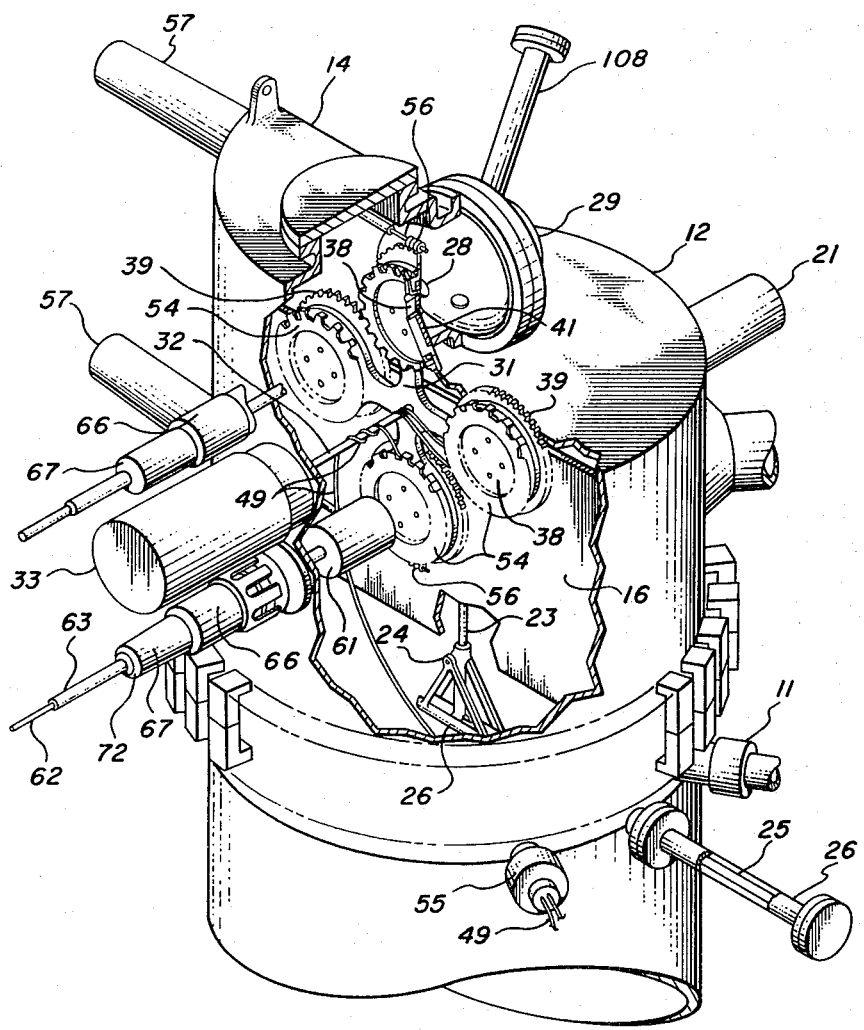
FIG. 2 illustrates another partial cutaway view of the apparatus including a showing of a transport mechanism.

FIGS. 1 and 2 illustrate in partial cutaway two views of a solar simulator and measurement apparatus incorporating the principles of this invention. As illustrated in this embodiment there is provided an evacuable cylindrical lower housing 10 to which are connected conventional non-contaminating, ultra-high vacuum pumps (not shown) for obtaining an ultra high vacuum approximating that of space within the housing. A plurality of conventional vacuum tight feed-throughs 11 are provided around the lower housing for various ancillary functions of the apparatus such as admission of gases to the inner chamber, gauges for measuring vacuum, electrical leads for components within the vacuum chamber and the like. A cylindrical upper housing 12 is clamped to the lower housing 10 by a conventional high vacuum flange 13. The upper housing 12 also includes an upstanding semi-cylindrical portion 14 for providing access to a measuring station as hereinafter described in greater detail. Within the upper housing 12 there is also an opaque partition 16 which is substantially a continuation of the flat wall of the semi-cylindrical housing portion 14. An exposure aperture 17 is provided in the partition 16 which divides the upper housing 12.

In the cylindrical portion of the upper housing 12 there is provided a conventional ultra-violet source 18 such as a high energy, high pressure, mercury capillary lamp, xenon or neon filled lamp or the like. The selection of a particular model of ultraviolet source depends on the intensity and spectrum of ultraviolet radiation desired either approximating solar radiation intensity or exceeding solar intensity for accelerated testing. If desired an external solar simulating source can be employed to project a light beam through a window in the chamber and onto the specimen. If this is done a radiometer, Faraday cup or the like can be located where the ultra-violet source 18 is in the illustrated embodiment.

A conventional ultraviolet radiometer 19 is provided in an aperture in an opaque floor 20 for measuring the intensity of ultraviolet radiation from the ultraviolet source 18. A proton source 21 (FIG. 2) is mounted on the upper housing 12 so as to irradiate the aperture 17 with particulate radiation simulating that of space.

Thus, for example, a conventional Duoplasmatron which produces low energy protons or low energy electrons, or both, may be employed for simulating the particulate portion of solar radiation. Other particle generators for production of neutral particles, high energy charged particles, (X-rays) and the like may be provided if desired.

An opaque shutter 22 is arranged in the housing 12 to be movable between a position in front of the aperture 17 and a position remote from the aperture 17 as illustrated in FIG. 1. The shutter 22 is on the end of a shaft 23 mounted on a pivot 24 as seen in FIG. 2. The end of the shaft 23 opposite from the shutter 22 is connected to a slidable rod 25 in a tube 26. A magnetic portion on the movable shaft 25 in the portion of the tube 26 external to the housing 11 permits pivoting of the shutter about the pivot 24 by manipulation with a magnet from outside the vacuum system so that the shutter can be moved to obscure or reveal the aperture 17 as desired. A bellows and screw arrangement can be employed in lieu of the tube and magnet arrangement. Thus a specimen in the aperture 17 can be exposed to simulated solar radiation for a precise time interval after the ultraviolet intensity, particle flux, and specimen temperature have been stabilized.

In operation of the simulator a plurality of samples 27 are mounted for motion between the exposure aperture 17 and a measuring aperture 28 in an optical integrating sphere 29 described in greater detail hereinafter. A transport mechanism is provided for moving the specimens between the measuring aperture 28 and the exposure aperture 17.

Figure 3:
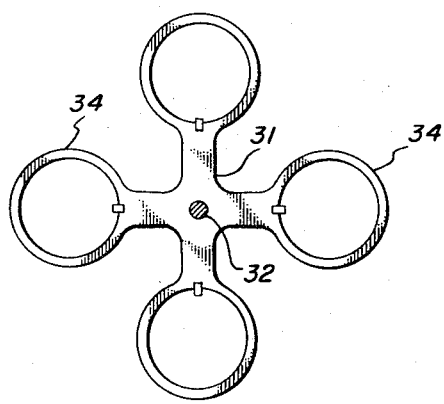
FIG. 3 illustrates a support wheel for the transport mechanism.

The transport mechanism comprises a cruciform support wheel 31 seen in place in FIG. 2 and in detail in FIG. 3. The support wheel 31 is centrally mounted on a rotatable shaft 32 which is connected to a conventional rotary motion hermetic feed-through 33 so that the shaft 32, and hence the support wheel 31, can be rotated from outside the vacuum system. At the end of each of the arms of the cruciform support wheel 31 there is a circular loop 34 for supporting a specimen mounting plate 36. Four specimen plates of the preferred embodiment are seen from the rear in FIG. 2 and portions of three such plates can also be seen from the front in FIG. 1. A detailed cross-section of a typical specimen mounting plate 36 is illustrated in FIG. 4.

In the typical specimen mounting plate arrangement illustrated in FIG. 4, a conventional ball bearing 37 is mounted peripherally within the loop 34 so as to provide rotatable support for a circular metal disk 38 which has a conventional spur gear 39 mounted at the periphery thereof and extending beyond the outer edge of the loop 34. An insert plate 41 is bolted to the disk 38 and four circular grooves 42 are provided in the front surface of the insert plate 41 to define four circular specimen stations 43 substantially flush with the front surface of the insert plate. A spring clip 44 is provided in each of the circular grooves 42 for securing a specimen or sample 27 on each of the specimen stations 43. The specimens 27 in one embodiment may, for example, be flat aluminum disks having a thermal control coating on one side thereof. It will be apparent that other types of samples may be employed if desired, and other specimen station arrangements may be provided.

Behind each specimen 27 is a thermocouple 46 slidably mounted in the insert plate 41 and urged toward the specimen by a spring 47 the other end of which bears against a hollow set screw 48 in a passage through the disk 38. Thermocouple lead wires 49 pass through the helical spring 47 and the center of the hollow set screw 48 and then outwardly pass through a transverse or radial hole 51 in the disk 38 leading out to the periphery thereof.

A series of upstanding ears 52 on the reverse side of the disk 38 engage upstanding ears 53 on a sheet metal ring 54 to form an enclosure for a coil of thermocouple wires 49. The thermocouple wires pass radially outwardly from one of the transverse holes 51 and back between sets of ears 52 and 53 into the enclosure between the disk 38 and the ring 54. Within the enclosure the wires are collected in a loose spiral bundle. Individual wires in the bundle proceed around the periphery in the enclosure several times and then pass between a pair of ears 53 as seen in FIG. 2 to be wrapped around the shaft 32 and finally passed to a vacuum feed-through 55 on the lower housing 10. The thermocouple lead wires are thus continuous from the thermocouple 46 through the vacuum feed-through 55 thereby avoiding any problems due to slip rings or unknown temperatures of the cold junction of the thermocouple.

The tortuous path of the thermocouple wires within the enclosure and around the shaft 32 is provided to accommodate rotary motion of various components without binding the thermocouple wires. Thus when one of the disks 38 at one of the specimen mounting stations is rotated within the loop 34 on the support wheel 31 the bundle of thermocouple wires within that station's enclosure either tightens or loosens depending on the direction of rotation. Since several turns of thermocouple wire are accommodated within the enclosure, it is possible to make nearly three full turns of the disk 38 and the samples 27 supported thereon in one direction without any binding of the thermocouple wires. In practice the disks are rotated from one position to another during operation in first a clockwise and then a counter-clockwise direction for only one or two full turns so that binding is never a problem. The reason for rotating the sample mounting disks is for positioning a specimen in front of the measuring aperture 28 and it is of no consequence whether rotation to that position is clockwise or counter-clockwise.

In a similar manner the coils of thermocouple wires about the shaft 32 upon which the support wheel 31 is pivoted permits rotation of the support wheel for approximately two full revolutions in either direction without any binding of the thermocouple wires. Again, it is of no consequence whether the support wheel is rotated clockwise or counter-clockwise for positioning samples between the measuring aperture and the exposure aperture. It should be recognized that in the illustration of FIGS. 2 and 4 only a small portion of the numerous thermocouple wires 49 are illustrated for clarity and that in practice sixteen pairs of thermocouple wires are involved.

As has been mentioned, hereinabove it is often desirable to rotate the disk 38 upon which the specimens are mounted and a spur gear 39 is provided on the periphery of the disk for such rotation. In each the measuring position and the exposure position of the wheel 31, worm gears 56 are mated with the spur gear 39 on a station for rotation of the spur gear. Each of the worm gears is shaft mounted and is rotated by way of a conventional rotary motion feed-through 57 from outside the evacuable housing.

In operation of a thermal control coating in space the temperature may be relatively high when the coating is exposed to sunlight or is on a high temperature portion of a spacecraft. Conversely, the temperature of the coating may be fairly low when the coating is in the shade and on a relatively cool portion of the spacecraft. Thus it is often desirable to irradiate specimens at elevated or reduced temperatures and likewise to measure the optical properties of the thermal control coating at high and low temperatures. Therefore, temperature control heat sinks 61 (FIG. 2) are provided at both the exposure and measurement stations. The heat sinks 61 are heat transfer devices movable between a position remote from the sample holders and a position having a face in contact with the reverse side of the disk 38 upon which the samples are mounted. If it is desired to control the temperature of the specimens at something other than the ambient temperature in the simulator, the cylindrical heat sink 61 is advanced as hereinafter described in greater detail so that the end thereof is in direct contact with the reverse side of the disk 38. Water at any desired temperature, liquid nitrogen, hot gases or the like may then be passed through the heat sink 61 to control its temperature. Thus by thermal contact of the heat sink 61 with the disk 38 and ultimately the sample 27, the temperature of the sample is controlled. The heat sinks 61 are retractable from the reverse face of the disk 38 so that there is no obstruction to rotation of the support wheel 31 in transferring specimens between the exposure aperture and the measurement aperture.

A mechanism as illustrated in FIG. 5 is employed for moving each of the heat sinks 61 into and out of contact with the disk 38. In this arrangement a heating or cooling fluid is passed to the heat sink by way of an inner tube 62 and the fluid is withdrawn by way of an outer tube 63 concentric with the inner tube 62. The mechanism for advancing and withdrawing the tube 63 to which the heat sink is attached includes a plate 64 which is welded to the upper housing (not shown in FIG. 5) to provide a vacuum seal. A hollow housing 66 is welded to the plate 64 and a fixed sleeve 67 is bolted to the housing 66. An externally threaded sleeve 68 is secured to the outer tube 63 and a longitudinal slot 69 in the threaded sleeve 68 engages a set screw 71 in the sleeve 67 to prevent rotation of the threaded sleeve 68 but permit longitudinal motion thereof. A threaded nut 72 engages the external threads on the sleeve 68 and the nut is prevented from moving longitudinally relative to the outer sleeve 67 by three equally spaced keepers 73 fastened to the sleeve 67 and engaging a peripheral groove 74 in the nut. Thus when the nut 72 is rotated it is fixed in position relative to the fixed sleeve 67 and causes the threaded sleeve 68 to slide longitudinally thereby moving the tube 63 and hence the entire heat sink.

A tube 76 welded to the plate 64 supports a flexible metal bellows 77 which is in turn connected to another tube 78, the interiors of which are in communication with the evacuated portion of the apparatus. A conventional coupling 79 seals the tube 78 to the tube 63. The coupling 79 and the tube 78 move with the tube 63 when the nut 72 is rotated thereby flexing the bellows 77 when the heat sink is advanced.

A heat sink 61 useful in practice of this invention is illustrated in FIGS. 6 and 7. As illustrated therein the heat sink is in the form of a cylindrical canister 81 connected in fluid communication on the end of the outer tube 63. A baffle plate 82 obstructs a principal portion of the cross-section of the canister 81 and the inner tube 62 is connected to the baffle plate 82 with the interior of the tube in fluid communication with the far side of the baffle plate. In this arrangement heat transfer fluid passes through the inner tube 62, enters the body of the canister 81 and flows over or around the baffle plate 82 to return through the outer tube 63. This insures turbulence of fluid within the canister of the heat sink so that good heat transfer is obtained.

Referring again to FIGS. 1 and 2, measurement of the optical properties of specimens in the simulation and measurement apparatus is provided in the upper semi-cylindrical portion 14 when the specimens are arranged adjacent the measuring aperture 28 in one wall of the optical integrating sphere 29. The optical arrangement for making measurements of optical properties of specimens is illustrated in the sectional and partly schematic view of FIG. 8. As illustrated in this drawing, the semi-cylindrical portion 14 of the upper housing is sectioned to show an edge of the cruciform support wheel 31 with one of the disks 38 and insert plates 41 shown schematically in cross-section in front of the measuring aperture 28. The heat sink 61 at the measuring station is withdrawn from contact with the back of the disk 38 to show the mounting shaft 32 for the support wheel 31.

A circular mounting flange 83 is provided on the flat face 84 of the semi-cylindrical portion 14 of the housing. This flange and the mounting arrangement of the optical sphere 29 thereto is shown in greater detail in FIG. 9. The optical integrating sphere is made in the form of two hemispherical halves 86 and 88 bolted together. One half 86 of the sphere has a circumferential flange 87 and the other half 88 of the sphere has a circumferential flange 89. The two circumferential flanges 87 and 89 on the hemispherical halves of the integrating sphere are sealed together by a conventional metal-to-metal steel 91 and bolted together by a ring of bolts 92 extending around the flanges. This semi-permanently connects the two hemispheres together so that the optical integrating sphere 29 can be handled as a unit and connected to or removed from the evacuable portion of the apparatus without disconnecting the two halves of the sphere.

The flange 87 on the inner of the hemispheres 86 is sealed to the flange 83 on the flat face of the apparatus by a conventional metal-to-metal seal 93 and is connected thereto by a ring of bolts 94 interspersed with the ring of bolts 92. It will be apparent that since the measuring aperture 28 is merely a hole in the side of the sphere that the interior of the optical integrating sphere is in vacuum communication with the interior of the apparatus. Optical windows, of which window 96 is typical, are also provided in the sphere. Each of these windows has a sapphire pane 97 connected to a conventional glass-to-metal transition which is in turn, welded to the hemisphere 88.

Referring again to FIG. 8 the optical arrangement external to the simulation and measurement apparatus vacuum chamber is illustrated. In this view a conventional spectro-reflectometer 98 such as, for example, a Beckman Instruments DK-lA is employed for measurement of the optical properties of a specimen. The spectro-reflectometer provides a light beam of controllable wavelength and includes reflection measurement instrumentation. As used herein it is employed principally as a light source. In the spectro-reflectometer an oscillating mirror 99 alternately reflects a light beam along paths 101a and 101b. In each of these paths the respective light beam 101a or 101b is reflected from a mirror 102 and directed through an optical integrating sphere 103. The integrating sphere 103 of the conventional spectro-reflectometer is not used directly in operation of the simulation and measurement apparatus herein described but is retained in position in the light paths so that specimens may be provided in the windows thereof for calibration purposes.

The typical light beam 101a after passing through the optical integrating sphere 103 is converged by a concave mirror 104a and directed to a flat mirror 106a which in turn reflects the light beam through a window 96a in the optical integrating sphere 29. The light beam 101a is directed to the measuring aperture 28 so as to fall upon a specimen mounted therein.

The light beam 101b follows a similar path to the light beam 101a except that it is directed onto a standard surface 107 having known optical properties. In practice the oscillating mirror 99 of the spectro-reflectometer causes this instrument to alternately illuminate a specimen in the measuring aperture 28 and the standard surface 107 by way of the optical paths 101a and 101b, respectively so that the optical properties of the specimen at each wavelength are continually compared with the standard surface. A conventional photomultiplier tube or lead sulfide photodetector (not shown) is mounted in a housing 108 (FIGS. 1 and 2) so that the measuring aperture of the photodetector is substantially flush with the inner surface of the optical integrating sphere 29.

In order to obtain measurements of the optical properties of a specimen in the measuring aperture 28 the specimen and the standard surface 107 are alternately illuminated by the spectro-reflectometer 98 with light of a selected wavelength. Light scattered from the specimen or standard surface, respectively, is sensed by the photomultiplier and the measured light intensity is determined by the reflectance of the respective surfaces. The photomultiplier views substantially the entire inner surface of the optical integrating sphere 29 and in order to obtain maximum response from the instrument the interior of the optical integrating sphere is coated with a layer of magnesium oxide smoked on in a conventional manner; that is, by burning magnesium ribbon in the sphere to deposit finely divided magnesium oxide on all exposed surfaces. Magnesium oxide forms a high reflectivity diffuse coating on the interior of the optical integrating sphere and this material is preferred since its reflectance is substantially insensitive to wave-length over a relatively broad range of wavelengths. Any light reflected from the specimen or standard surfaces, respectively, is also reflected by the magnesium oxide coated interior of the optical integrating sphere and measured by the photomultiplier so that the angular position of the photomultiplier relative to the surfaces is immaterial. This type of spectral reflectance measurement employing an optical integrating sphere and obtaining comparative values between an unknown specimen and a known surface is a conventional technique.

It has also been found in practice of this invention that absolute measurements of spectral reflectance can be made with an improved optical integrating sphere used in place of the conventional integrating sphere 29. Such an improved sphere 109 is illustrated in FIGS. 10 and 11 which show a pair of cross-sections of the improved optical integrating sphere in orthogonal directions. As in the previously described embodiment of an optical integrating sphere 29, the improved sphere 109 is formed in two hemispherical halves 111 and 112, respectively. A measuring aperture 113 is provided in a side of the hemisphere 111 so that a specimen 114 can be positioned in the aperture for reflectivity measurements. A light source 116 such as the above described spectro-reflectometer for providing monochromatic illumination of the specimen 114 is provided outside a window 117 in the hemisphere 112. The light source 116 is directed so as to illuminate only the specimen 114 or alternately a selected portion of the interior wall of the hemisphere 111.

A photomultiplier 118 mounted in a housing 119 so that the measuring aperture of the photomultiplier is substantially flush with the inside surface of the sphere is also located in the hemisphere 112. An opaque shield 120 is mounted on a wire frame 121 clamped between the two hemispheres 111 and 112. The concave surfaces of the opaque shield 120 are coated with a layer of highly reflective magnesium oxide as is the interior of the integrating sphere 109 and the wire frame 121. The opaque shield 120 is arranged exactly between the photomultiplier 118 and the specimen 114 so that no direct reflection from the specimen falls on the photomultiplier. The shield 120 also obscures that portion of the wall of the hemisphere 111 illuminated by the light source 116 in its alternate mode, so that the light reflected from that region of the wall does not fall directly on the multiplier 118.

In operation the spectro-reflectometer 116 is employed as hereinabove described and a light beam of known wavelength is alternately directed on the specimen 114 and on the wall of the hemisphere 111 in the region obscured from the photomultiplier 118 by the opaque shield 120. The photomultiplier measures the intensity of light reflected from the specimen 114 and illuminated portion of the hemisphere 111, respectively.

By arranging the photomultiplier flush with the wall of the hemisphere 112 and providing an opaque shield 120 between the photomultiplier and the directly illuminated portion of the sphere, the photomultiplier receives light reflected from substantially all interior surfaces of the integrating sphere 109 except that region directly illuminated by the light source 116. That is, all light falling on the photomultiplier 118 has been reflected by the interior surface of the optical integrating sphere. Thus, for example, when the specimen is illuminated, light reflected therefrom cannot travel directly to the photomultiplier because of the shield but can reach that instrument only after reflecting off the highly reflective magnesium oxide coating within the optical integrating sphere. Since all light, in any case, reaching the photomultiplier is reflected at least once off of the magnesium oxide surfaces and the comparison standard is, in effect, the magnesium oxide surface of the hemisphere 111 directly illuminated by the light source 116, the effect of the standard or reference surface is cancelled out and direct measurement or absolute of the reflectance of the specimen is obtained.

By eliminating any requirement for known surfaces for making comparative measurements of reflection, many of the uncertainties involved in calibration of the instrument with known surfaces are removed. The best previously known arrangement for making absolute measurements of reflection characteristics involved mounting a specimen in the center of an optical integrating sphere. Such a sphere is described in a paper in *Applied Optics*, Vol. 51, November 1961, at pages 1,279 to 1,288, entitled, "*Integrating Sphere for Imperfectly Diffuse Samples*" by D. K. Edwards, J. T. Geir, K. E. Nelson and R. D. Roddick. This paper also presents the mathematical theory of optical integrating spheres including the theoretical relationships for absolute and relative measurements of reflectance. The experimental arrangement of Edwards et al. with the specimen in the center of the sphere leads to substantial experimental difficulties when a plurality of specimens are to be measured since removing and replacing specimens in the center of the sphere is difficult, particularly in remote handling as in a vacuum system.

The improved optical sphere provided in practice of this invention permits absolute measurements to be made of the reflection characteristics of a surface with the specimen mounted in an aperture in the side of the optical integrating sphere. It is apparent that means are readily provided such as hereinabove described for changing specimens in the measuring aperture of the sphere so that numerous samples can be measured or samples can be measured before and after exposure to a simulated space environment. The integrating sphere herein described and illustrated with an opaque shield 120 between the photodetector and the directly illuminated portion on the wall of the sphere satisfies the theoretical relations for absolute reflectance measurements as set forth in the above mentioned Edwards et al. paper.

Referring again to FIGS. 1 to 4, in operation of a simulation and measurement apparatus as provided in practice of this invention a plurality of specimens 27 are mounted on the raised specimen stations 43 on the disks 38 and secured in place by the spring clips 44. Thermocouples 46 are placed against the specimens for measuring the temperature thereof and the thermocouple lead wires 49 wound through the spiral paths hereinabove described and thence out of the vacuum system for making temperature measurements. The vacuum system can then be sealed and the apparatus evacuated for producing a simulated space environment.

After a vacuum has been maintained for a selected time the specimens are sequentially placed in the measuring aperture 28 and the reflection characteristics of each determined by the optical techniques hereinabove described. Each specimen is in turn placed in front of the measuring aperture 28 by rotation of the support wheel 31 by means of the rotary motion seal 33 and by rotation of the specimen mounting disks 38 by the worm gear 56 connected to the rotary motion feedthrough 57. After the optical characteristics of the specimens are obtained they are positioned in the exposure aperture 17 by rotation of the support wheel 31. The ultraviolet source 18 and proton source 21 are adjusted to a desired intensity level and then the shutter 22 is swung into a position exposing specimens in the exposure aperture 17 to the flux from the ultraviolet source and proton source thereby simulating solar radiation falling on the specimens 27. During exposure the temperature of the specimens may be controlled by contacting the reverse side of the mounting disk 38 with a heat sink 61 through which is circulated a heat transfer fluid.

After a selected exposure time the shutter 22 is swung back into position obscuring the exposure aperture and the solar simulating sources 18 and 21 are shut off. The specimens are then moved to the measurement aperture 28 again for further measurement of the reflectance to determine what changes, if any, have occurred due to exposure to vacuum and simulated solar radiation. It will be apparent that several cycles of such exposure can be provided and a variety of samples can be illuminated and tested under a variety of test conditions such as temperature, time, and radiation flux, in an apparatus as provided in practice of this invention, all without opening the vacuum system. It has been found that changes do occur in specimens due to exposure to gases after a simulated space environment, therefore it is desirable to perform the entire sequence of measurements in the vacuum simulating space.

Obviously many modifications and variations can be provided in practice of this invention. Thus, for example, other forms of support wheel and specimen mounting can be employed for specimens of a geometry different from the flat disks described herein. Other measurements than the optical reflectivity can be made at the measurement aperture and a variety of exposure arrangements may be employed.

What is claimed is:

1. In an evacuable simulator, an improved transport mechanism within the evacuable portion of the simulator comprising:
    a support wheel;
    a specimen mounting member on said support wheel, said specimen mounting member including means for mounting a plurality of separate specimens;
    means for measuring the temperature of each of said specimens; and
    means for moving said support wheel for transferring said specimen mounting member between a simulation station within the evacuable portion of the simulator and a measurement station also within the evacuable portion of the simulator.

2. In a simulator as defined in claim 1 an improved support wheel comprising:
    a cruciform support member;
    a pivotal mounting for said support member at the center of said cruciform, and between said simulation station and said measurement station;
    a plurality of said specimen mounting members, one located at the end of each of the arms of the cruciform support member.

3. In a simulator as defined in claim 2 an improved specimen mounting member comprising:
    a plate mounted at the end of each cruciform arm for rotary motion in the plane of the support member;
    a plurality of specimen receiving locations on one face of said plate; and
    a driven gear at the periphery of said plate; said simulator further comprising:

a driver gear engaging said driven gear and connected to drive means external to the evacuable portion of the simulator.

4. In a simulator as defined in claim 1 an improved support wheel having a plurality of support sites each for one of said mounting members;

and wherein each of said mounting members comprises;

a plate mounted for rotary motion within the plane of the support wheel and including drive engaging means for effecting rotary motion of said plate;

a plurality of specimen receiving locations in a circular pattern on one face of said plate, each of said locations including a specimen securing member, a thermocouple element, and means for urging the thermocouple element into contact with a specimen in the respective receiving location; and a thermocouple lead wire enclosure on said plate to accommodate a continuous length of wire sufficient to permit limited rotary motion of said plate without binding of the wire.

5. In a simulator as defined in claim 1 an improved transport mechanism wherein:

said support wheel comprises a support member having a plurality of arms, a loop at the end of each of said arms; and further comprising a plurality of said specimen mounting members, one located at the end of each of the arms of the support member, each of said specimen mounting members comprising:

a low friction bearing mounted in said loop;

a plate mounted in said bearing for rotary motion in the plane of the support member;

a driven gear at a periphery of said plate;

a plurality of specimen receiving locations on one face of said plate, each of said locations including means for holding a specimen in place, thermocouple adapted for contacting a specimen in said location, and means for passing leads from the thermocouple to a periphery of said plate; and an enclosure on the opposite side of said plate from said specimen receiving locations, said enclosure having a plurality of openings on the periphery thereof for receiving thermocouple lead wires and having sufficient internal volume to accommodate a continuous length of thermocouple lead wire in a loose circumferential array to permit limited rotary motion of said plate without binding of the wire; and said plate further comprising;

an unobstructed rear portion opposite said specimen receiving locations for contact with a heat exchanger.

* * * * *